F. B. PURDIE.
PORTABLE KITCHENETTE.
APPLICATION FILED SEPT. 11, 1920.
1,406,758.
Patented Feb. 14, 1922.
3 SHEETS—SHEET 2.
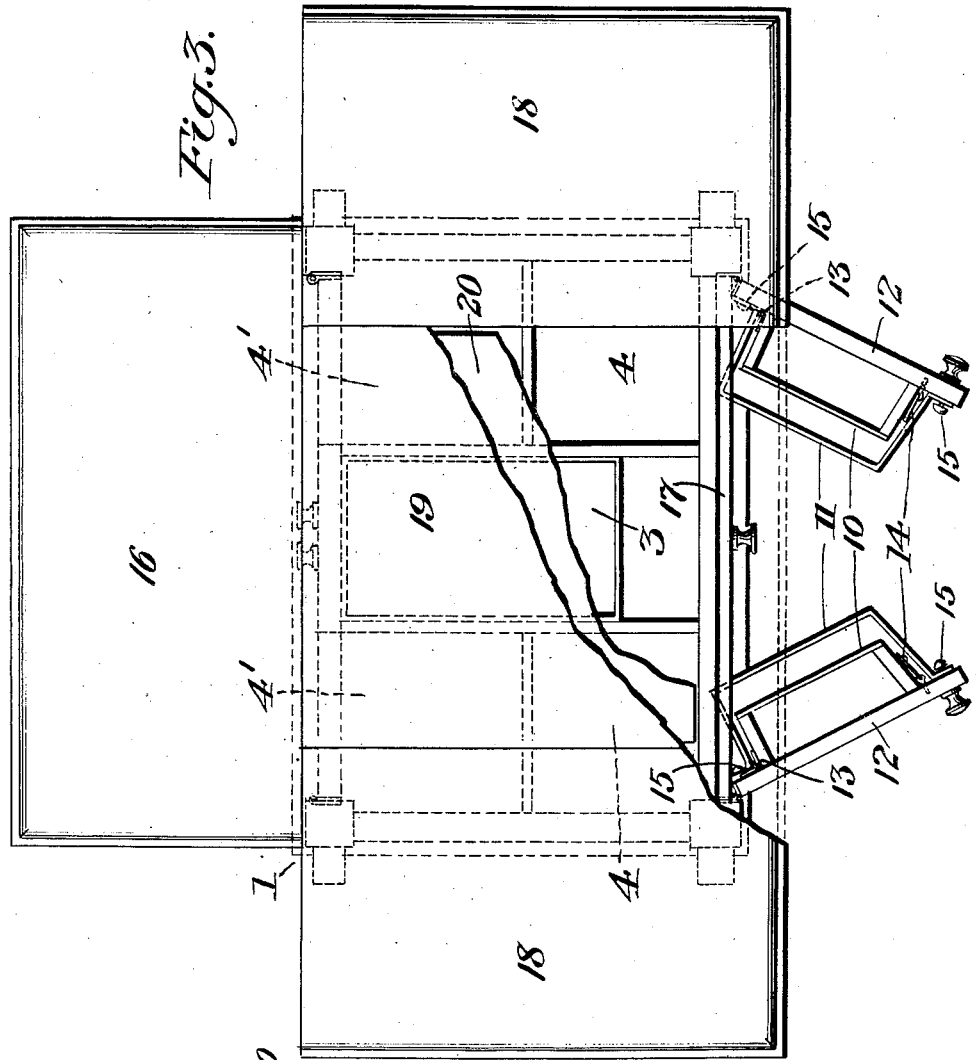
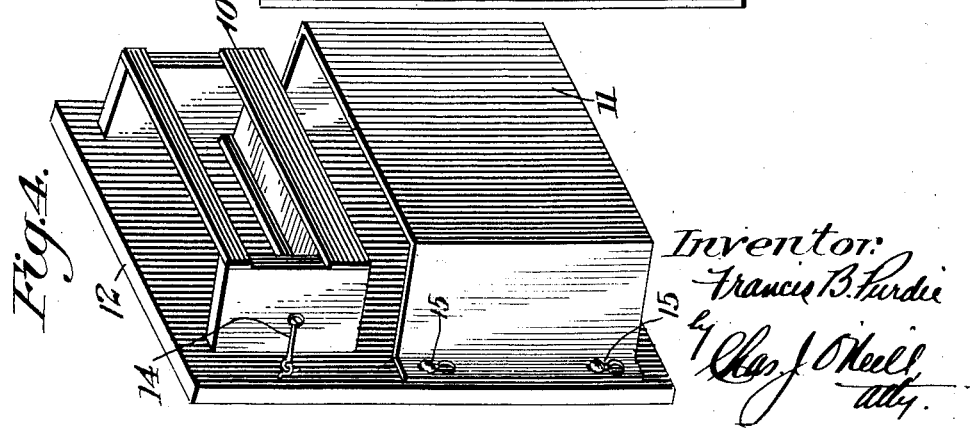
Inventor:
Francis B. Purdie
by Chas. J. O'Neill
atty.

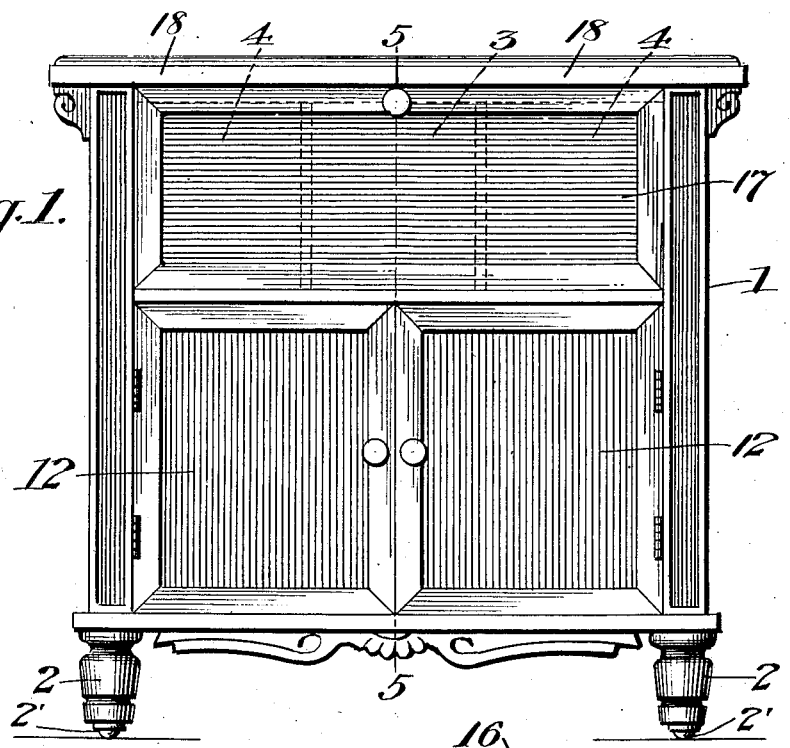
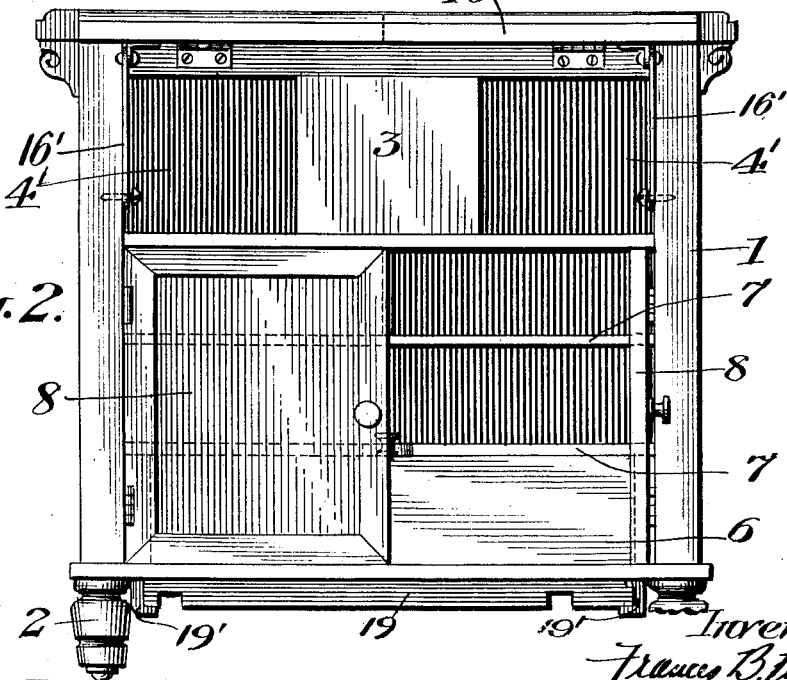

F. B. PURDIE.
PORTABLE KITCHENETTE.
APPLICATION FILED SEPT. 11, 1920.

1,406,758. Patented Feb. 14, 1922.
3 SHEETS—SHEET 3.

Inventor
Francis B. Purdie
by Chas. J. O'Neill
Atty.

UNITED STATES PATENT OFFICE.

FRANCIS B. PURDIE, OF ALBANY, NEW YORK.

PORTABLE KITCHENETTE.

1,406,758. Specification of Letters Patent. Patented Feb. 14, 1922.

Application filed September 11, 1920. Serial No. 409,691.

*To all whom it may concern:*

Be it known that I, FRANCIS B. PURDIE, a citizen of the United States, residing at Albany, county of Albany, State of New York, (whose post-office address is 459 Broadway, Albany, New York,) have invented certain new and useful Improvements in Portable Kitchenettes; and I do hereby declare the following to be a full, clear, and exact description of the invention, such as will enable others skilled in the art to which it appertains to make and use the same.

This invention relates to cabinets, and particularly to a kitchenette of the portable type, and is adapted for use in small apartments or the like where the space is more or less restricted and limited.

The principal object of the invention is the production of a cabinet of the type indicated which will be comparatively small, yet sufficiently large to contain within certain limits all of the necessary ingredients for preparing a meal, including a refrigerator compartment and also means for accommodating a portable stove, cooking utensils, chinaware, table linen, and in fact, everything necessary to a complete article of furniture of this character, the cabinet further forming, by certain manipulations, a table upon which the meal can be served.

The invention also contemplates a support for a stove of the portable type for furnishing the necessary cooking appliance and thereby providing a complete cabinet, including the various arrangements and combinations hereinbefore referred to, the whole when in inoperative and closed relation forming a neat, compact and attractive article of furniture.

Referring generally to the improved cabinet, which is preferably of rectangular shape, the upper portion thereof includes an intermediate ice compartment and four smaller compartments, two for containing food of a perishable nature, and two for housing the stove and cooking utensils when not in use, the whole being covered by a top made in two sections and adapted to be extended beyond the ends of the cabinet to form a table.

The lower portion of the cabinet is provided on each side with a pair of hinged doors, one pair of doors when open disclosing a drawer and shelving for containing table linen, silverware, dishes and the like. The other half of the lower portion of the cabinet, which is also closed by two doors, is likewise provided with shelving and each of these doors has hinged to the back thereof a box-like compartment which is well adapted for storing supplies, groceries and the like. Directly beneath each of these hinged compartments is another larger compartment secured to the back of the door by a screw and key slot arrangement, in order to facilitate its removal for the purpose of cleaning and the like. Likewise the hinged compartments above referred to may be moved away from the back of the doors and also readily cleaned. On one side of the cabinet immediately above the double doors, is constructed a hinged drop shelf and on the opposite side thereof is provided a hinged leaf, which, when raised in position forms a portion of a table top, cooperating with the extensible top sections of the cabinet. The space between the extension top sections is supplied with a leaf section normally carried, when not in use, on suitable supports beneath the cabinet.

In the accompanying drawings:

Fig. 1 is a view in elevation showing one side of the cabinet in its closed position;

Fig. 2 is a view of the opposite side thereof with the hinged leaf in raised position and one of the lower doors open, showing the various arrangements of compartments and shelving, etc.;

Fig. 3 is a plan view with the top extended and the hinged leaf raised to form a table, a portion of the figure being broken away to show the ice and refrigerator compartments and also the receptacles secured to the back of one pair of doors;

Fig. 4 is an enlarged detail view showing the means of securing and positioning the various receptacles with respect to the hinged doors;

Figure 5:
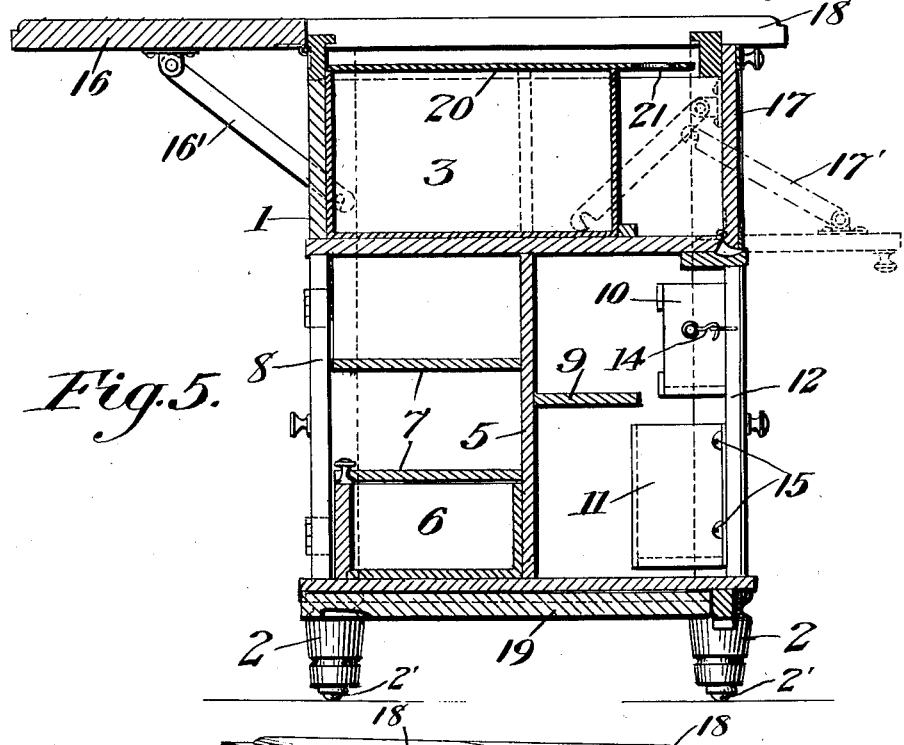
Fig. 5 is a sectional view on line 5—5 of Fig. 1.
Figure 6:
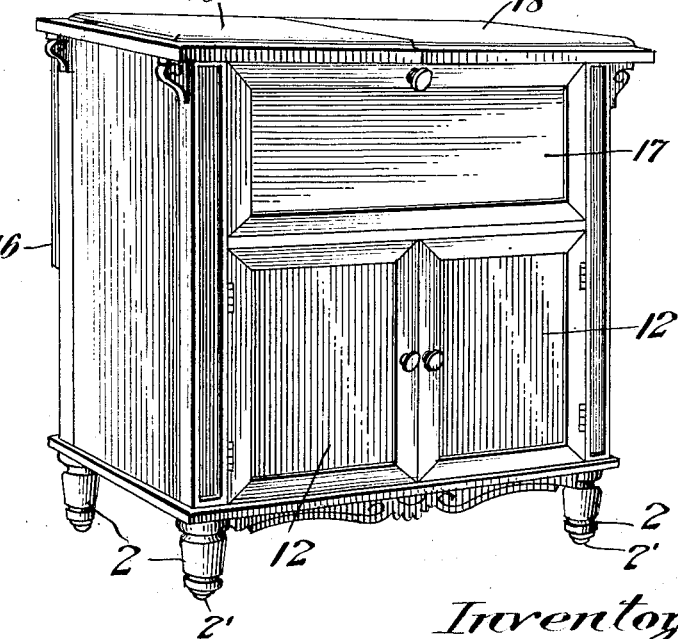
Fig. 6 is a perspective view of the cabinet in its closed and inoperative position.

Referring to the drawings in detail, the invention comprises a cabinet 1 of preferably rectangular shape, supported upon legs or the like 2, preferably provided with rollers or casters $2^1$, the interior of which being divided into upper and lower portions, said upper portion comprising an ice receptacle 3, a pair of refrigerator compartments 4 and storage compartments $4^1$ for housing a portable stove and cooking utensils when not in use. The lower portion of the cabinet is sub-divided longitudinally thereof by a partition 5, providing on one side a drawer 6 and shelving 7, extending the full depth of this compartment, the whole being closed by a pair of hinged doors 8. On the opposite side of the partition 5 is arranged a shelf 9 which, however, does not extend the full depth of this compartment, in order to leave room for the box-like receptacles 10 and 11, which are secured to the doors 12, closing the other half of this lower portion of the cabinet. The receptacle 10 is secured at one end thereof to the door by hinges 13 and at the other end by a hasp or latch 14. With this arrangement these compartments can be swung away from the door when desired to facilitate the cleaning thereof and allow the same to be always kept in a sanitary condition. The receptacle 11, arranged immediately below the receptacle 10, is slightly larger than said receptacle 10 and secured to the door by a screw and key slot connection 15, as clearly shown in Fig. 4. By means of this construction the receptacle 11 is also detachable from the door, making it possible to always maintain this receptacle also in a clean and sanitary condition as the same will be readily removable for cleaning purposes. These receptacles 10 and 11, being secured to the hinged doors 12, the articles contained therein are completely exposed to view and conveniently located and accessible when the doors are fully opened, at the same time they will not interfere with articles that might be contained or placed on the shelving 9. Located immediately above the doors 8 on one side of the cabinet is a hinged leaf or the like 16, provided with a pair of supporting brackets or links 16¹, which leaf is adapted to be raised or elevated and when in this position is on a level with the top of the cabinet. On the opposite side of the cabinet, above the doors 12, is a drop shelf 17, which shelf is also provided with supporting links 17¹, for maintaining said shelf in its extended position. The whole cabinet is covered by a top consisting of two extensible sections 18, which in their normal position are brought together to form said top or cover for the cabinet. When it is desired to convert the top of the cabinet into a table these sections 18 are extended and the intermediate space formed by the extension thereof is filled by a leaf 19, which normally is carried beneath the cabinet upon brackets or tracks 19¹. The extensible sections 18 and the leaf 19, together with the hinged leaf 16 form a very convenient and satisfactory table for general use and when it is not desired to use the same as a table the various parts can be contracted and rearranged and the cabinet reduced to its normal size and shape.

To prevent the ice compartment and refrigerator compartments from being exposed when the top sections 18 are extended, there is provided an intermediate cover plate 20, which is preferably porcelain and upon which the stove is supported while in operation and thereafter removed when it is desired to use the whole table top for serving a meal. This plate 20 is provided with an opening 21, so that the same may be conveniently removed for the purpose of refilling the ice compartment.

From the foregoing description it will be apparent that applicant has combined in a unit, various features and arrangements, producing a cabinet wherein the usual kitchen supplies and various foods may be stored, and by simple adjustments and manipulations, the said cabinet will offer adequate facilities for preparing said food and serving the same, all on the same article of furniture.

What I claim is:

A portable kitchenette, combining a table, kitchen cabinet, ice box and cooking facilities, comprising a main body structure having upper and lower sub-divided portions and closures therefor, said sub-divided upper portion consisting of an intermediate ice compartment, and stove and storage compartments disposed each side of said ice compartment opening on opposite sides of said structure, the closures of said upper portion comprising vertically swinging hinged side members normally closing the stove and storage compartments, and extensible top sections, said top sections when extended permitting access to the ice compartment and adapted to be supplied with an intermediate section removably carried by the main body structure, to form a table, said hinged side members when extended forming additional enlargements of said table and permitting access to said stove and storage compartments, one of said side members adapted to swing upwardly to form an adjoining extension of the table, and the other adapted to swing downwardly to provide an extension in a plane below the plane of the table.

In testimony whereof I affix my signature.

FRANCIS B. PURDIE.